United States Patent Office 3,493,547
Patented Feb. 3, 1970

3,493,547
ACRYLONITRILE COPOLYMERS
Jenö Szita, Horst Wieden, Heinrich Rinkler, Herbert Marzolph, and Günther Nischk, Dormagen, Germany, assignors to Farbenfabriken Bayer Aktiengesellschaft, Leverkusen, Germany, a corporation of Germany
No Drawing. Filed Jan. 23, 1967, Ser. No. 610,806
Claims priority, application Germany, Feb. 2, 1966,
F 48,319
Int. Cl. C08f 15/22
U.S. Cl. 260—79.3                                    4 Claims

ABSTRACT OF THE DISCLOSURE

Acrylonitrile polymers containing at least 70% acrylonitrile and having improved affinity for basic dyes, good thermal stability, and low gelation are prepared by incorporating 0.5 to 20% by weight of the monomers of copolymerizable, unsaturated carboxylic acid hyrazide sulfobetaine into the polymer by copolymerization.

This invention relates to acrylonitrile copolymers containings sulfobetaine groups and to a method of producing said acrylonitrile copolymers showing a high affinity for basic dyes, coupled with significant advantages in dyeability.

Filaments and yarns produced from acrylonitrile homopolymers and copolymers with neutral comonomers lack the affinity for dyes which is needed in industrial practice. Accordingly, it is extremely difficult to dye them to fairly dark shades with basic and acid dyes. The reason for this lies in the absence or in the deficiency of dye-receptive groups in the polymer. Several proposals for modifying acrylonitrile polymers have already been put forward with a view to overcoming these drawbacks.

For example it has already been proposed to copolymerise acrylonitrile with a basic comonomer such as, for instance, vinyl pyridine or a derivative thereof. Although it has been found possible in this way to increase the dyeability of the acryonitrile polymer so far as acid dyes are concerned, other properties such as the degree of whiteness and the thermal stability of the polymer and its affinity for basic dyes were detrimentally affected.

In order to improve the dyeability of the polymer with respect to basic dyes, copolymers have been prepared with cocomponents containing carboxyl groups, such as acrylic acid and methacrylic acid or itaconic acid. Unfortunately, there copolymers show a particularly marked tendency to discolour at elevated temperatures.

Although receptivity to basic dyes can be increased by incorporating comonomers with sulpho groups into the acrylonitrile polymer, the known processes are still unsatisfactory in many respects from the industrial point of view. Sodium methallyl- and allyl sulphonates can only be copolymerised with acrylonitrile with low yields, and only a fraction of the comonomers used is incorporated into the polymer. This disadvantage also attends the copolymerisation of acrylonitrile with N-monosubstituted acrylamide derivatives containing sulpho groups, such as N-acryloyl taurine or N-acryloyl-p-aminophenyl-methane sulphonic acid. Furthermore, the vinyl benzene sulphonic acids often used as comonomers for acrylonitrile are difficult to obtain in adequate purity on a large scale.

The textile industry occasionally requires acrylonitrile copolymers with a relatively high sulpho group content, for example, in cases in which it is desired to obtain filaments with a high, reversible swellability in water.

The products spun from polymers such as these are attended by the common disadvantage that their saturation values and adsorption rates with respect to basic dyes are excessively high on account of the large number of strongly acid groups present therein. Such properties present considerable difficulties in the dyeing industry so far as uniformity of dyeing is concerned. Another disadvantage is that, after they have been dyed, fibre materials such as these undergo a marked decrease in their swellability.

It is also known that unsaturated compounds with betaine or sulphobetaine groups can be polymerised together with acrylonitrile. Unfortunately, the affinity of the copolymers for basic dyes is not improved to any appreciable extent.

It is an object of the present invention to provide acrylonitrile copolymers consisting of at least 70% by weight of acrylonitrile and other copolymerisable unsaturated compounds, using singly or together with an other comonomer 0.5% to 20% by weight of a copolymerisable, unsaturated carboxylic acid hydrazide sulfobetaine.

Another object of the invention is to provide a method of producing in high yields acrylonitrile polymers with an acrylonitrile content of at least 70% an improved affinity for basic dyes and advantageous dyeing properties, coupled with a high thermal stability and a low tendency towards gelation, by polymerising acrylonitrile together with from 0.5% to 20% of unsaturated, copolymerisable carboxylic acid hydrazide sulphobetaines, optionally together with other comonomers.

The unsaturated carboxylic acid hydrazide sulphobetaines correspond to the formula:

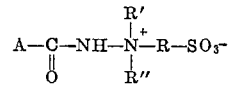

in which A represents an aliphatic, aromatic or araliphatic radical with an unsaturated copolymerisable group, R represents an alkylene radical and R′ and R″ represent lower alkyl radicals or, together with the quaternary nitrogen atom, represent a heterocyclic radical.

One particular advantage of the process according to the invention is that the acrylonitrile copolymers or the products obtained therefrom such as films, fibres and filaments, show unexpected, particularly favourable dyeing properties. The absorption rate and the saturation value of basic dyes can be adjusted by adjusting the pH-value of the dye bath in the acid range, or can be displaced during dyeing by altering the pH. It is possible in this way, by the control of the pH, to create optimum conditions for bright and dark dyeing in fibre materials with a high saturation value, or to obtain a high degree of uniformity in the case of dark-shade dyeing.

In particular, the process of the invention can facilitate overdyeing and blended-fabric dyeing in dark shades of polyacrylonitrile filaments, in combination with other types of fibre (for example, with wool, using dyes on the wool). The copolymers according to the invention are easy to prepare. Polymerisation is not affected by the comonomers and good yields can be obtained. Highly concentrated spinning solutions can be prepared from them which show a reduced tendency towards gelation and which can be spun quite easily using conventional processes. The comonomers incorporated according to the invention have a marked stabilising effect against discolouration at elevated temperatures, both in solution and after forming. The spun filaments and fibres exhibit outstanding physical properties, even where the co-component content is relatively high. Their abrasion resistance is significantly increased, whilst their improved hydrophilic and antistatic properties remain intact even after they have been dyed.

The following are examples of comonomers with carboxylic acid hydrazide sulphobetaine structures:

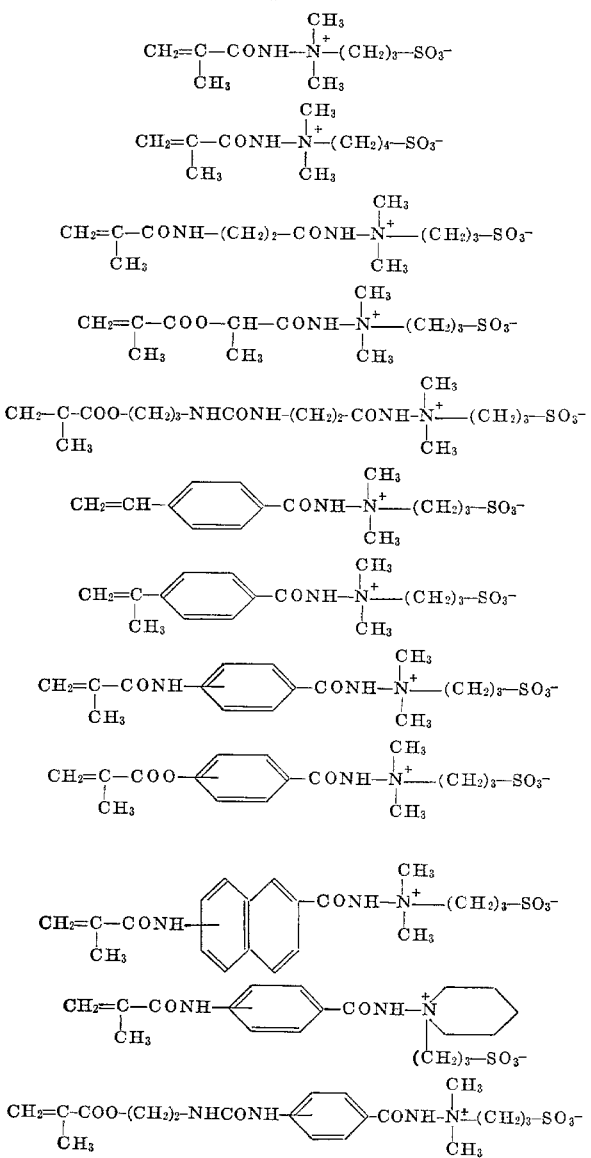

According to one of our earlier proposals, these compounds can be prepared by quaternising unsaturated N,N-disubstituted carboxylic acid hydrazides with propane or butane sultone for example. The aforementioned carboxylic acid hydrazides are individually prepared. In general, they can be obtained by reacting unsaturated carboxylic acid chlorides with the corresponding N,N-disubstituted hydrazines. The unsaturated carboxylic acid hydrazide sulphobetaines referred to above are colourless solid substances. Most of them are highly soluble in water and can still be dissolved in methanol and ethanol. They can be polymerised with the aid of known catalysts, preferably in an aqueous medium, either on their own or together with other copolymerisable unsaturated compounds.

The copolymers with acrylonitrile according to the invention contain between 0.5% and 20%, preferably between 1% and 10%, of compounds with carboxylic acid hydrazide sulphobetaine groups.

Copolymerisation may also be carried out in the presence of further unsaturated compounds which can be copolymerised with acrylonitrile. Comonomers of this kind include inter alia acrylates and methacrylates, vinyl esters, styrene and its derivatives, vinyl chloride, vinylidene chloride, butadiene, chloroprene, acryl- and methacrylamides, vinylalkyl ketones, divinyl compounds, vinylidene cyanide, as well as co-monomers of basic character such as vinyl pyridine and its derivatives.

It is possible, in some cases, by incorporating a third co-component in the copolymer, for example, methyl methacrylate, methyl acrylate, vinyl acetate or N-tert.-butyl acrylamide: further to improve the dyeing properties of the fibres. The copolymers may contain between 2% to 10% of these co-components.

Acrylonitrile can be copolymerised with the carboxylic acid hydrazide sulphobetaines and, optionally, with other monomers by conventional polymerisation processes, for example, in emulsion, dispersion of solution. The usual emulsifiers such as salts of fatty acids, alkyl or aryl sulphonates and nonionic emulsifiers, may be used for emulsion polymerisation. Solution polymerisation can be carried out in aqueous, concentrated salt solutions such as zinc chloride solution, or solutions of inorganic thiocyanates, and in organic solvents such as dimethyl formamide, dimethyl sulphoxide, ethylene glycol carbonate or butyrolactone, in the presence of radical catalysts such as, for example, azo compounds, peroxides or Redox systems which are able to initiate the polymerisation reaction.

However, polymerisation is preferably carried out in aqueous solution in the presence of radical-forming catalysts of catalyst systems instead of emulsifiers. Suitable catalysts of this type include, for example, hydrogen peroxide, organic hydroperoxides, alkyl peroxides, ketoperoxides, acylperoxides and persulphates, although azo compouds such as azodiisobutyronitrile may also be used. In general, however, it is preferred to use Redox systems, particularly those based on per compounds and sulphur compounds at low oxidation states.

Although water-soluble salts of peroxydisulphuric acid, e.g. sodium, potassium or ammonium persulphate, are preferably used as per compounds in the Redox system, perborates, perphosphates, perchlorates and chlorates inter alia are also suitable. Highly effective reduction components include the following sulphur compounds which are at low oxidation states: sulphur dioxide, alkali metal hydrosulphites, alkali metal pyrolsulphites and alkali metal thiosulphates, or the corresponding ammonium salts.

A Redox system consisting of potassium or sodium persulphate and potassium or sodium hydrogen sulphite or pyrolsulphite is preferably used as a catalyst in the preparation of the copolymers according to the invention. The quantity in which the Redox system is used is generally between 0.5% and 5%, based on the total weight of the monomers. The ratio between the oxidation and reduction components can be between 4:1 and 1:50, but is preferably between 1:2 and 1:10. Heavy metal ions, in the form of their salts, may be added in small quantities (1–1000 p.p.m.) in order further to activate the Redox system. Sulphates, chlorides and nitrates of bivalent iron and copper are particularly effective. Apart from the salts used as Redox catalysts, suitable neutral salts such as alkali metal sulphates and phosphates may also be present in the polymerisation mixture. If desired, radical-reactive substances, the so-called regulators such as mercaptans, for example, as well as compounds of complex-forming character, such as metaphosphoric acid, oxalic acid and ethylene diamine tetraacetic acid or salts thereof, may also be used in the process according to the invention. Polymerisation is carried out either continuously or in batches in the usual way. The water used as a polymerisation medium is employed in an quantity which is approximately 5 to 10 times the quantity of the monomers used.

The reaction temperature is between 10° C. and 70° C., preferably between 40° C. and 55° C. The pH value of the reaction medium is between 2 and 6, preferably between 2.5 and 5. Concentrated inorganic acids such as sulphuric acid or phosphoric acid, or organic acids such arylsulphonic acids, are used to adjust the pH value. Polymerisation is preferably carried out in an inert gas atmosphere (for example nitrogen), although it may even be carried out in the presence of air. On completion of polymerisation, the copolymers which accumulate in the form of fine grains are separated from the liquid phase, usually by filtration or centrifuging, washed neutral with desalted water and dried under reduced pressure or in a current of hot air. The polymers prepared for fibre purposes generally have K-values according to Fikentscher (Cellulosechemie 13, 1932, p. 58) of between 75 and 110, preferably between 80 and 90.

The parts and percentages indicated in the specification and in the following examples, which are intended to illustrate the invention in more detail, are parts by weight and percentages by weight, respectively, based on the total quantity, unless otherwise stated.

EXAMPLES 1 TO 11

900 g. of desalted water were run into a glass reaction vessel, equipped with a stirring mechanism, a contact thermometer a nitrogen inlet and a reflux condenser, and adjusted to pH 3.5 with 20% sulphuric acid. Following displacement of the air by nitrogen, the reaction vessel was heated to 50° C. The predetermined quantity of unsaturated sulphobetaine, 70 g. of acrylonitrile and, optionally, a third comonomer, were then added in solution, followed ultimately by the introduction of the catalysts (potassium persulphate and sodium pyrosulphite), each dissolved in 20 ml. of water. If necessary, the pH-value was corrected to 3-3.5 by the addition of more sulphuric acid. Polymerisation was carried out at 50° C. under a protective nitrogen pressure (5–10 mm. Hg), and was stopped after a reaction time of four hours. The fine-grained polymer precipitated was isolated by filtration, washed with desalted water until it was free from acid and dried in vacuo at 60° C.

Various sulphobetaine comonomers were copolymerised with acrylonitrile in this way. The comonomers used and the comonomer content (percent by weight) of the monomer mixture, the quantities of catalyst, the yields obtained and the K-values of the polymers (according to Fikentscher, Cellulosechemie 13, page 58 (1932)) as measured in 0.5% dimethyl formamide solution at 20° C., are set out in the following Table 1:

TABLE 1

| Ex. No. | Co-component Type [1] | Percent by weight | Catalysts K₂S₂O₈, g. | Catalysts Na₂S₂O₅, g. | Conversion, Percent | K-value |
|---|---|---|---|---|---|---|
| 1 | I, AME | 1, 5 | 0.60 | 1.80 | 83 | 85.3 |
| 2 | I | 5 | 0.55 | 1.10 | 81 | 84.0 |
| 3 | II, AME | 1, 5 | 0.55 | 1.65 | 85 | 84.7 |
| 4 | II | 5 | 0.45 | 0.90 | 84 | 81.5 |
| 5 | II | 10 | 0.40 | 0.80 | 80 | 83.1 |
| 6 | III | 2.5 | 0.60 | 1.20 | 92 | 83.9 |
| 7 | III | 5 | 0.55 | 1.10 | 89 | 85.7 |
| 8 | III | 10 | 0.55 | 1.10 | 87 | 87.7 |
| 9 | IV | 8 | 0.55 | 1.10 | 89 | 86.0 |
| 10 | V | 8 | 0.55 | 1.10 | 88 | 94.8 |
| 11 | None (comparison) | 0 | 0.70 | 1.40 | 87 | 88.2 |

[1] AME=methyl acrylate.

FORMULAE OF CO-COMPONENTS I–V

I:   CH₂=C(CH₃)—CO—NH—N±(CH₃)₂(CH₂)₃—SO₃⁻

II:  CH₂=C(CH₃)—CO—NH—N±(CH₃)₂(CH₂)₄—SO₃⁻

III:
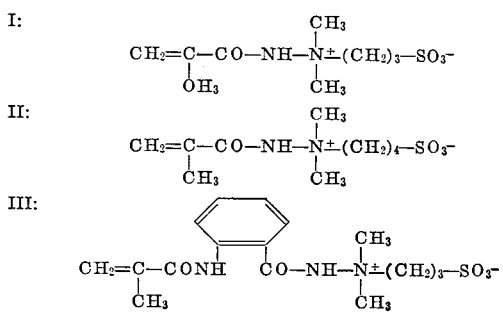

IV:
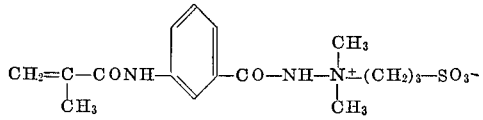

V:
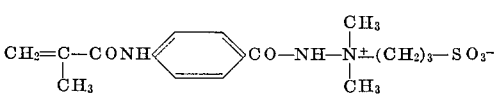

In order to test the tendency to discolour in a dimethyl formamide solution at an elevated temperature of the comonomers according to the invention, 5% polymer solutions were heat treated at 80° C. in the presence of air. After intervals of 2, 4 and 20 hours, the extinction values of the solutions were determined by means of an electrophotometer (Type Elko III, manufactured by Messrs. Zeiss) at a wave-length of 470 mμ (cell thickness: 5 cm., comparison solution: pure dimethyl formamide). The results are set out in the following Table 2:

TABLE 2

| Polymer of Example No. | Extinction after— 2 hours | 4 hours | 20 hours |
|---|---|---|---|
| 1 | 0.202 | 0.250 | 0.495 |
| 2 | 0.208 | 0.235 | 0.506 |
| 3 | 0.215 | 0.276 | 0.583 |
| 4 | 0.217 | 0.330 | 0.620 |
| 5 | 0.220 | 0.318 | 0.59 |
| 6 | 0.188 | 0.260 | 0.51 |
| 7 | 0.177 | 0.257 | 0.49 |
| 8 | 0.190 | 0.232 | 0.46 |
| 9 | 0.198 | 0.274 | 0.44 |
| 10 | 0.205 | 0.285 | 0.47 |
| 11 (comparison) | 0.330 | 0.518 | 0.08 |

The copolymers according to the invention, prepared in accordance with Examples 1 to 10, contain acid groups which can be accurately detected, for example by potentiometric titration. Detection was carried out as follows: 1 g. of polymer was dissolved in 100 ml. of distilled dimethyl formamide which had been treated with a mixed-bed ion-exchanger (Merck Type V). Approximately 10 cm.³ of the mixed-bed ion exchanger were introduced into the solution which was then stirred for from 30 minutes to 1 hour. The solution was then filtered off and 50 ml. thereof were titrated with an n/100 solution of KOH in methanol. A pH-meter of the kind manufactured by Messrs. Knick, Type 52 (calomel-glass electrode) was used as the measuring instrument. The results of the measurement are given in Table 3 in milliequivalent acid groups/100 g. of polymer (ME acid gr./100 g. pol.).

The increased affinity of the aforementioned copolymers for basic dyes can be demonstrated very easily by dyeing films. For this purpose, films were cast from approximately 15% dimethyl formamide solutions in a layer thickness of approximately 50μ. After some 24 hours' drying in vacuo at 60° C., the films were washed with hot water until they were free from solvent and were then dried. The films thus prepared were dyed as follows with the basic dye Astrazonblau (Color Index, 2nd Edit., vol. III, No. 42140):

Composition of the dye bath: Ml.
 Astrozonblue B-solution (1 g./l.) _____ 100
 Acetic acid (30 g./l.) _____ 2
 Sodium acetate (40 g./l.) _____ 0.3

The dye was dissolved in boiling water, filtered and then measured out while still hot. Approximately 0.5 to 1 g. of film was added at a dye bath temperature of 80° C., and dyed for 1 hour on reaching the boiling temperature. The films thus dyed were washed thoroughly with water and then dried.

In order quantitatively to determine the amount of dye absorbed, the dyed films were carefully dissolved in dimethyl formamide containing 1 g./l. of sulphuric acid. The amount of dye absorbed was determined by measuring the extinction values at a wave-length of 625 m$\mu$ (absorption maximum of the dye) with the aid of a spectral photometer and a calibration curve (extinction vs. g./l. of dye).

The measurement results are set out in the following Table 3 (g. dye×100 g. film):

TABLE 3

| Polymer of Example No. | ME acid, gr./ 100 g. Pol. | g. dye×100 g. film |
|---|---|---|
| 1 | 5.4 | 0.73 |
| 2 | 20.8 | 2.76 |
| 3 | 5.8 | 0.77 |
| 4 | 21.5 | 2.92 |
| 5 | 38.0 | 8.74 |
| 6 | 9.3 | 1.02 |
| 7 | 16.7 | 1.60 |
| 8 | 34.6 | 6.41 |
| 9 | 25.2 | 3.68 |
| 10 | 26.8 | 4.16 |
| 11 | 2.2 | 0.24 |

The fact that dyeability is governed by pH can be demonstrated by dyeing films prepared from the same polymer in dye baths with different pH values. Films prepared from Polymer No. 9 were each dyed in 100 ml. of 0.16% Astrazonblau B-solutions with different pH-values which were adjusted as follows:

pH:
 1.5, 2.0, 2.5, 3.0, 3.5, with 10% H$_2$SO$_4$
 4.0, 5.0, with 3% CH$_3$COOH
 6.0 with 4% CH$_3$COONa-solution The dyeing and the determination of the quantities of dye absorbed were carried out as described above. The results are set out in Table 4:

TABLE 4

| pH-value | g. dye×100 g. film |
|---|---|
| 1.5 | 0.21 |
| 2.0 | 0.37 |
| 2.5 | 0.71 |
| 3.0 | 1.23 |
| 3.5 | 2.87 |
| 4.0 | 3.58 |
| 5.0 | 3.71 |
| 6.0 | 3.80 |

What we claim is:
1. Normally solid random copolymers consisting of:
  (A) at least 70% by weight of acrylonitrile;
  (B) 0.5% to 20% by weight of a copolymerizable, unsaturated carboxylic acid hydrazide sulfobetaine of the formula

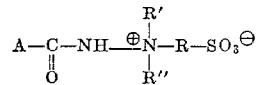

wherein A is an aliphatic, aromatic, or araliphatic radical with an ethylenically unsaturated, copolymerizable group, R is an alkylene radical, and R' and R" are lowed alkyl radicals or, together with the quaternary nitrogen atom, are a heterocyclic radical; and
  (C) 0 to 29.5% by weight of copolymerizable, ethylenically unsaturated monomer other than (A) and (B).

2. Acrylonitrile copolymer of claim 1, wherein said copolymerisable unsaturated carboxylic acid hydrazide sulfobetaine is a methacrylamido - N-phenyl - carboxylic acid-N,N-dimethyl-hydrazido-sulfobetaine.

3. A method for producing copolymers which comprises copolymerizing:
  (A) at least 70% by weight of acrylonitrile;
  (B) 0.5% to 20% of a carboxylic acid hydrazide sulfobetaine compound of the formula

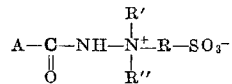

wherein A is an aliphatic, aromatic, or araliphatic radical with an ethylenically unsaturated, copolymerizable group, R is an alkylene radical, and R' and R" are lower alkyl radicals; and
  (C) 0 to 29.5% by weight of coplymerizable, ethylenically unsaturated monomer different from (A) and (B); in an aqueous medium at pH from 2 to 6 with Redox systems based on persulfate and sulphur compounds at low states of oxidation.

4. The method as claimed in claim 3, wherein methylacrylate or vinyl acetate is used as the comonomer (C).

References Cited

UNITED STATES PATENTS 3,412,077 11/1968 Szita et al. _____ 260—79.3
3,256,252 6/1966 Kruckenberg et al.
3,260,707 7/1966 Caldwell et al.

FOREIGN PATENTS 1,424,802 12/1965 France.

JAMES A. SEIDLECK, Primary Examiner

U.S. Cl. X.R.

8—55